(12) United States Patent
Barna

(10) Patent No.: US 6,216,947 B1
(45) Date of Patent: Apr. 17, 2001

(54) IDENTIFICATION CODE AND TAB SYSTEM

(76) Inventor: Joseph A. Barna, 3250 Normandy Cir., Marietta, GA (US) 30062

( * ) Notice: Subject to any disclaimer, the term of this patent is extended or adjusted under 35 U.S.C. 154(b) by 0 days.

This patent is subject to a terminal disclaimer.

(21) Appl. No.: 09/401,000

(22) Filed: Sep. 21, 1999

Related U.S. Application Data

(63) Continuation of application No. 08/772,816, filed on Dec. 23, 1996, now Pat. No. 5,971,270.

(51) Int. Cl.[7] .............................. G06F 17/00; G06K 7/02
(52) U.S. Cl. ............................................ 235/375; 235/145
(58) Field of Search .................................... 235/375, 382, 235/145 R, 386, 146, 149 A; 341/23, 22; 400/447

(56) References Cited

U.S. PATENT DOCUMENTS 5,971,270 * 10/1999 Barna .................................... 235/375

* cited by examiner

*Primary Examiner*—Thien M. Le
(74) *Attorney, Agent, or Firm*—Kilpatrick Stockton LLP

(57) ABSTRACT

The present invention includes is a system that includes an identification code reader that reads the identification code on a keypad overlay and displays the keypad type for which the keypad overlay is designed. The identification system includes a keypad overlay that has an identification code positioned thereon. The system also includes an identification code reader operative to read the identification code. The identification code reader has a database of information associated with a plurality of keypad overlays. In particular, the database stores information that associates each of the plurality of identification codes to specific keypad types for each of the plurality of identification codes. Each of the identification codes is associated with a keypad overlay that specifies the functions of keys on a specific keypad type. In response the identification code reader reading the identification code positioned on the keypad overlay, the identification code reader is operative to display the specific keypad type associated with the identification code positioned on the keypad overlay.

20 Claims, 3 Drawing Sheets

IDENTIFICATION CODE AND TAB SYSTEM

This application is a continuation of Ser. No. 08/772,816 filled Dec. 23, 1996, now U.S. Pat. No. 5,971,270.

REFERENCE TO RELATED APPLICATIONS

This application incorporates by reference U.S. Pat. No. 5,971,270 entitled "IDENTIFICATION CODE AND TAB SYSTEM" filed on Dec. 23, 1996, and issued on Oct. 26, 1999, which is commonly owned and assigned.

1. Field of the Invention

The present invention generally relates to a method of identifying products with an identification code and, more particularly, relates to tracking parts through a distribution, repair or replacement process.

2. Background of the Invention

Many methods of tracking or recording information related to products have been devised. A common method of tracking products is accomplished by including an identification code, which may be stored for reference, on the product when the product is manufactured or shipped. Identification codes typically used on products include numeric, symbolic, and alphabetic codes. One such code is commonly known as a bar code.

Identification codes, such as bar codes, are typically associated with information such as the date of manufacture, the type, color, size, quality, etc. of the product. When shipping a product to a customer, often the sender keeps a record of the product shipped to the customer by recording or scanning the identification code of the product sent. Many devices or methods are generally known and available for recording or scanning the identification codes.

While identification codes included on products serve a useful purpose to the sender, such identification codes are not always useful to the recipient. Consequently, the recipient may prefer not to have the identification code displayed on the product after the recipient receives the product. Additionally, the room or space on the product being shipped may be used by the recipient for information useful to the user of the product. Including an identification code on a product reduces the space available for other information or distracts from the appearance of the product.

When products are shipped to recipients, often the product is shipped with some form of protective covering. This is especially true for products that have an adhesive backing that is designed to secure the product to another device, Products that have an adhesive backing, such as certain types of templates that are placed over keypads to identify certain functions of keys, are often shipped with a removable protective layer Removing the protective layer from a template can be tedious. In order to peel the protective layer from the template, it generally requires a person to pick or pull at the boundary or edge of the template or protective layer to get a grip on the protective layer.

Additionally, a keypad template often has functions specified that are unique to the keypad or terminal for which the keypad template is designed. Although keypads for use with credit card terminals are often the same in physical structure, various keypads are programmed differently. Consequently, a keypad template may fit on a particular keypad although the keypad template is not designed for use with the particular keypad. When a person receives a template with certain functions designated on the keypad template, the person may not know if the keypad template with the specified functions is for the keypad upon which the person is planning to place the keypad template. If the user places the keypad template on the incorrect keypad, when the user presses a key with a certain function specified on the template, the keypad or terminal is not likely to produce the response intended by the user.

Thus, there is a need in the art for a system for including an identification code on a product without reducing the space for other useful information yet provides a tracking mechanism for the product. Additionally, there is a need in the art for a system to help identify a system that helps to ensure that keypad templates are placed on the correct keypad.

SUMMARY OF THE INVENTION

Generally described, the present invention provides a system for including an identification code on a product without reducing the space available on the product for other information. A system of the present invention associates a keypad overlay with the type of keypad for which the keypad overlay is designed for use.

Particularly, a system of the present invention includes a keypad overlay that has an identification code positioned thereon. The system also includes an identification code reader operative to read the identification code. The identification code reader has a database of information associated with a plurality of keypad overlays. In particular, the database stores information that associates each of the plurality of identification codes to specific keypad types for each of the plurality of identification codes. Each of the identification codes is associated with a keypad overlay that specifies the functions of keys on a specific keypad type. In response the identification code reader reading the identification code positioned on the keypad overlay, the identification code reader is operative to display the specific keypad type associated with the identification code positioned on the keypad overlay.

Thus, it is an object of the present invention to include an identification code on a product when the printing or working area of the product is limited.

Also, it is an object of the present invention to provide a system that includes an identification code reader that reads the identification code on a keypad overlay and displays the keypad type for which the keypad overlay is designed.

BRIEF DESCRIPTION OF THE DRAWINGS

The accompanying drawings, which are incorporated and constitute a part of the specification, illustrate preferred and alternate embodiments of the present invention and, together with a general description given above and the detailed description of the embodiments given below, explain the principles of the present invention.

DETAILED DESCRIPTION OF THE INVENTION

Figure 1:
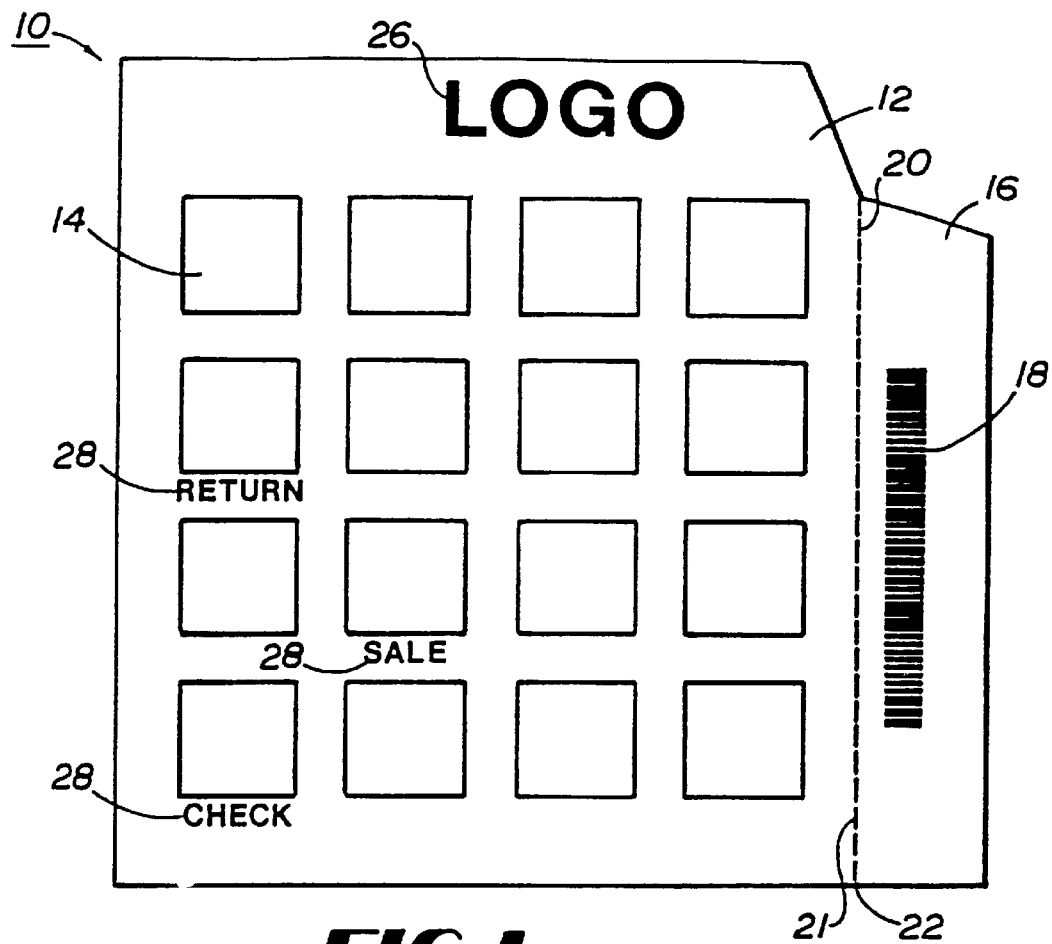
FIG. 1 is a keypad overlay constructed according to the preferred embodiment of the present invention.

Referring to the figures, where like numerals reference like parts throughout the views, the embodiments of the present invention is described. The present invention is generally directed to a detachable identification tab extending from the body of a particular device and a system for identifying a terminal upon which a template is to be placed. Referring to FIG. 1, an embodiment of a detachable identification code system 10 is shown. The detachable identification code system 10 includes a keypad overlay 12 having openings 14. The openings 14 of the keypad overlay 12 are designed to be positioned over selected keys of a designated keypad. The keypad overlay 12 has extending therefrom a detachable identification tab 16. The detachable identification tab 16 has an identification code 18 positioned thereon. The identification code may be numeric, symbolic, alphabetic, etc. For example, the identification code 18 illustrated in FIG. 1 is a bar code as commonly known by those skilled in the art.

The detachable identification tab 16 is connected or extends from edge 20 of the keypad overlay 12. The keypad overlay 12 is connected along the edge 20 of the keypad overlay 12 by a connector 22. The connector 22 may be manufactured as an integral portion of the keypad overlay 12 and the detachable identification tab 16. The connector 22 may be a seam, a perforated seam 21, adhesive material or any suitable means known by those skilled in the art.

The keypad overlay 12 generally comprises a paper material reinforced with a plastic upper layer. The keypad overlay 12 may be made of paper only, plastic only, or any other suitable materials or material combinations. Preferably, the keypad overlay 12 and the detachable identification tab 16 are manufactured as one unit with the detachable identification tab 16 being removable along the perforated seam 21 at the edge 20 of the keypad overlay 12. The keypad overlay 12 and detachable identification tab 16 may include an adhesive underside or adhesive surface that is covered by a removable protective layer. The adhesive may be any suitable glue or sticky substance as readily known by those skilled in the art.

The detachable identification code system 10 is particularly useful when an identification code needs to be associated with a small item or an item that contains limited printing space. As advantageously provided by the present invention, the detachable identification tab 16 can be connected by a manufacturer to the body of a unit such as the keypad overlay 12. The manufacturer or sender may then scan the identification code 18 provided on the detachable identification tab 16 for the particular keypad overlay 12 to record or review information associated with the identification code 18. The particular keypad overlay 12 has a "logo" 26, key function information 28, or other information that is associated therewith. By associating the "logo", the key function information 28, and/or other information with the identification code 18, the sender may track or keep a record of the particular keypad overlay 12 delivered to a customer. Thus, the manufacturer or sender can readily maintain records of the specific keypad overlay 12 sent to a customer.

Figure 2A:
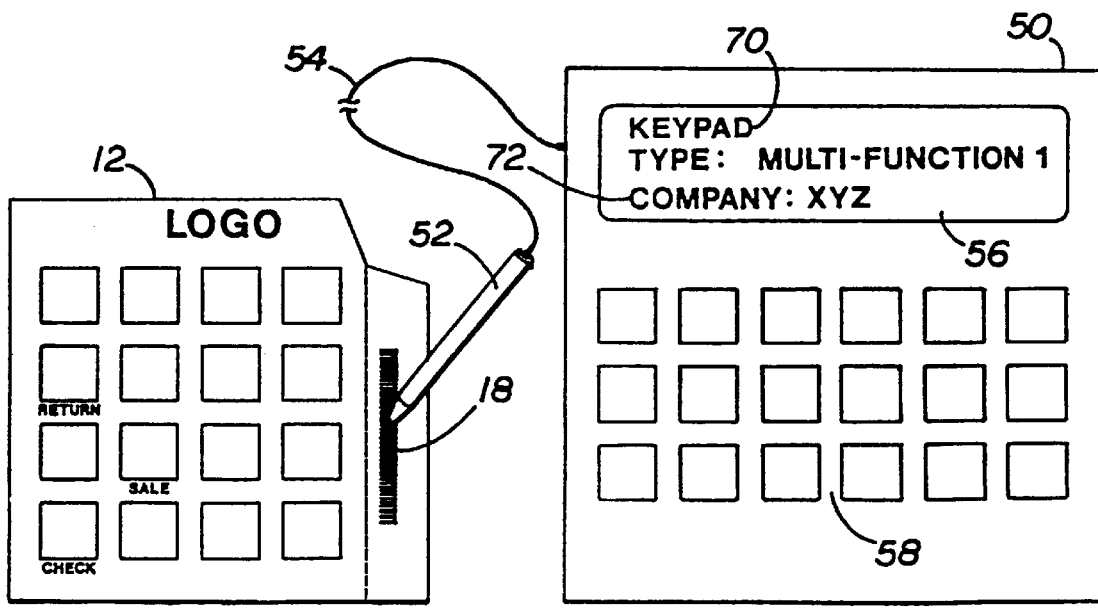
FIG. 2a illustrates an identification code reader reading the identification code of a keypad overlay.

When a customer receives a set of keypad overlays for particular keypads from a sender, the customer may verify that each keypad overlay is for the keypad upon which the customer is planning to put the overlay. In order to verify that the keypad overlay 12 is the keypad overlay designed for the keypad that the customer is planning to place the keypad overlay 12, the customer may scan, with a code reader, the identification code 18 of the detachable identification tab 16 before placing the keypad overlay 12 on the keypad. Scanning the identification code of an embodiment of the present invention identifies the type keypad or terminal for which the template is designed. Referring to FIG. 2a, a bar code reader 50 is shown. The bar code reader 50 may be any commonly available bar code reader capable of storing data associated with a bar code. The bar code reader 50 has a bar code scanning mechanism 52 connected to the bar code reader 50 by a cable 54. The bar code reader 50 has a display monitor 56 for displaying information associated with the identification code 18 (e.g. bar code) as scanned by the scanning mechanism 52. The display monitor 56 may also store and display information input via the bar code reader keyboard 58. The bar code reader 50 has stored therein information, supplied by a manufacturer or supplier of keypad overlays, that associates each identification code 18 with the keypad-type information and other relevant information.

Figure 2B:
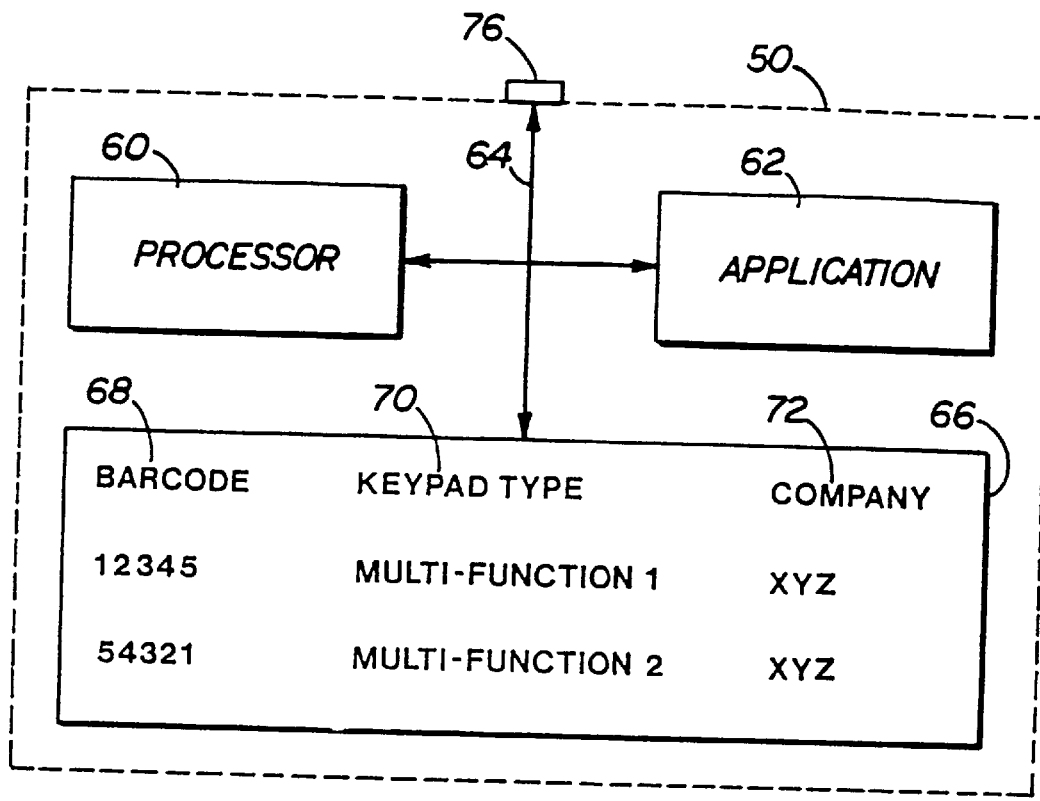
FIG. 2b illustrates the basic components of the identification reader.

Referring to FIG. 2b, the general components of the bar code reader 50 are shown. The bar code reader 50 has a processor 60 that is interfaced to an application program 62 stored in memory via a system bus 64 and is also interfaced with a database 66 that stores the bar code number and associated information. The application program 62 in conjunction with the processor 60 enables the bar code reader to read the data of a particular bar code and retrieve the information associated therewith. The database 66 has stored therein a record that associates or correlates bar code number information 68, keypad type information 70 and company name information 72. It should be appreciated that other information may be stored in the database 66 for association with the bar code. The information stored in the database 66 may be input through an input/output port 76 of the bar code reader 50. The information stored in the database 66 may be supplied by a manufacture or supplier of the keypads and/or overlays.

When a customer receives the keypad overlay 12 and before placing the keypad overlay 12 on a keypad, the customer preferably scans the identification code 18 with the scanning mechanism 52 of the bar code reader 50. Upon scanning the bar code identification code 18, the keypad type 70, such as "multi-function 1" and the company name, "XYZ" are displayed in the display monitor 56 of the bar code reader 50. Upon the display of the keypad type 70, the user may verify that the scanned identification code 18 associated with the keypad overlay indicates that the keypad overlay 12 is the proper keypad overlay 12 for the keypad contemplated for use by the user. A proper keypad overlay 12 specifies the correct functions on the keypad overlay 12 for the keypad for which the keypad overlay 12 is designed for use.

Figure 3:
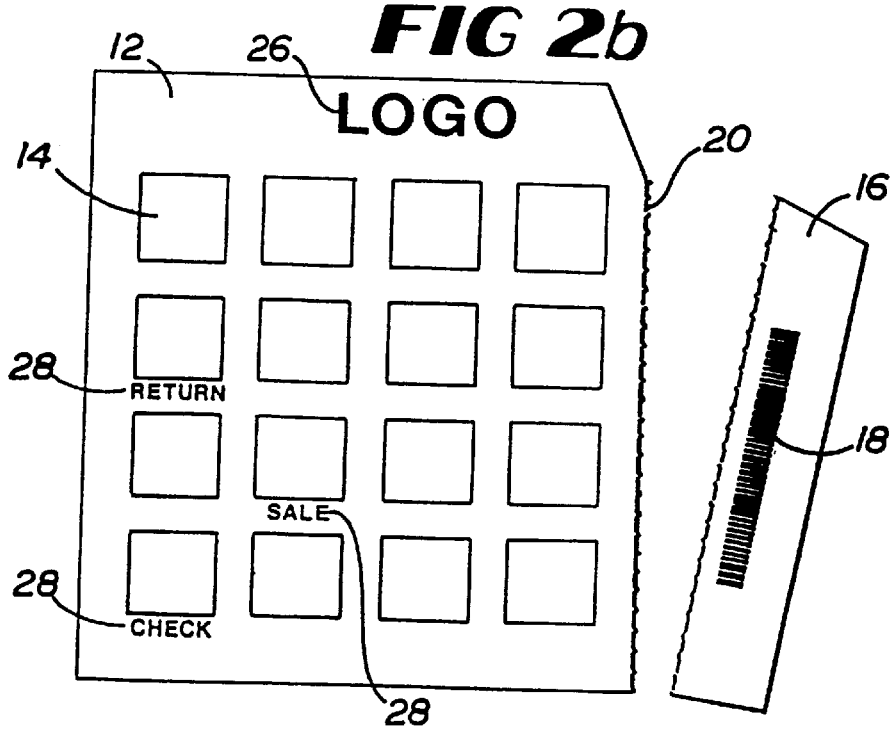
FIG. 3 illustrates the detachable identification tab removed from the keypad overlay.

After verifying that the keypad overlay 12 is appropriate for the intended keypad (e.g. the functions specified on the overlay correspond to the keypad-type), the customer may remove the detachable identification tab 16 from the keypad overlay 12 or the customer may leave the detachable identification tab 16 connected to the keypad overlay 12. FIG. 3 shows the detachable identification tab 16 removed from the keypad overlay 12.

Figure 4A:
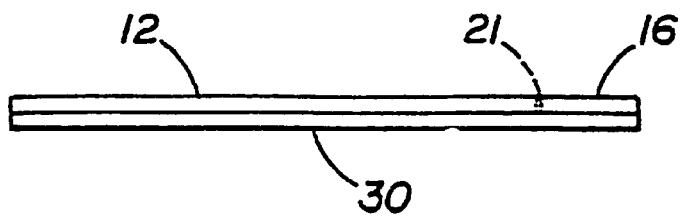
FIG. 4a illustrates a side view of the keypad overlay with a protective layer connected to a surface of the keypad overlay.
Figure 4B:
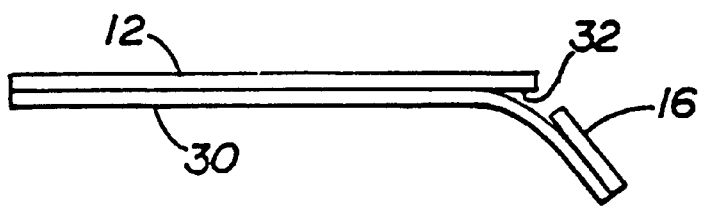
FIG. 4b illustrates a side view of the keypad overlay with the detachable identification tab facilitating the removal of the protective layer from the keypad overlay.

Referring to FIGS. 4a and 4b, a side view of the keypad overlay 12 is shown. A protective layer 30 is shown attached to an adhesive underside 32 of the keypad overlay 12. The protective layer 30 extends across the perforated seam 21 and is attached to the identification tab 16. When a person desires to remove the protective layer 30 from the keypad overlay 12, the person may remove the protective layer 30 from the keypad overlay 12 by detaching the identification tab 16 from the keypad overlay 12 as illustrated in FIG. 3 and 4b. Because the protective layer 30 adheres to the detachable identification tab 16, removal of the detachable identification tab 16 facilitates the removal of the protective layer 30 from the keypad overlay as illustrated in FIG. 4*b*.

Figure 5:
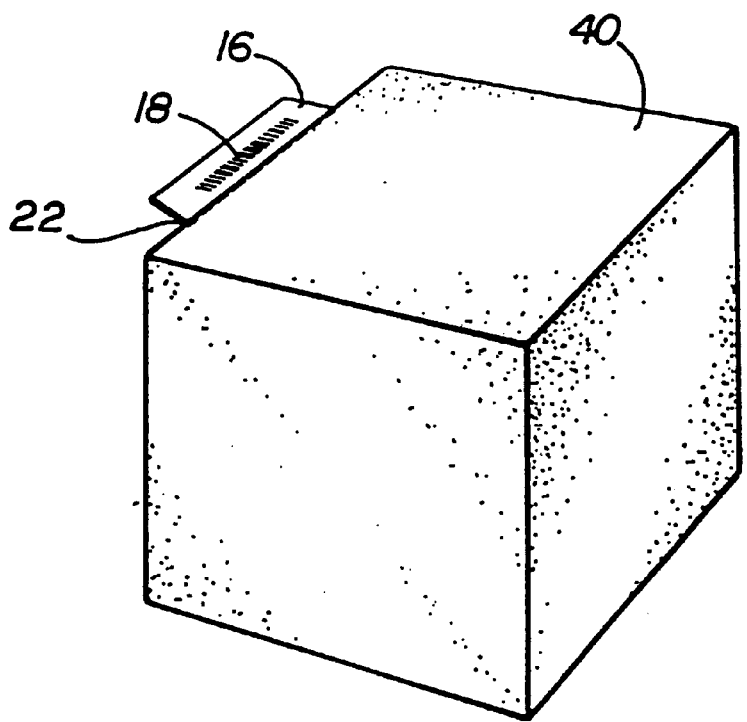
FIG. 5 is a box constructed according to the preferred embodiment of the present invention.

Referring to FIG. 5, another general embodiment of the present invention is shown. The embodiment illustrated in FIG. 5 is a box 40 containing a detachable identification tab 16. The box 40 may be manufactured with the detachable identification tab 16 attached thereto as described herein. For example, the box 40 may be a cardboard box manufactured with the detachable identification tab 16 extending therefrom. Thus, many adaptations and variations of the system of the present invention may be made without departing from the scope of the present invention.

While the present invention has been illustrated by the description of the preferred and alternative embodiments in detail this description does not restrict or limit the scope of the appended claims to such detail. Additional advantages and modifications will readily appear to those skilled in the art. Accordingly, departures may be made from such details without departing from the spirit or scope of applicant's general inventive concepts.

What is claimed is:

1. A system for associating a keypad overlay with the type of keypad for which said keypad overlay is designed for use, said system comprising:

an identification code; and a keypad overlay having an identification tab connected to and extending from said keypad overlay, said identification tab being detachable from said keypad overlay and including said identification code, said identification code being positioned on said identification tab and being indicative of a specific type of keypad upon which said keypad overlay is to be placed.

2. A substantially planar member for use in conjunction with a keypad, said planar member comprising:

a body portion for use as a keypad overlay; and a detachable identification tab connected to and extending from said body portion, said identification tab being detachable from said body portion and including an identification code, said identification code being positioned on said identification tab and being indicative of a specific type of keypad upon which said body portion is to be placed when said body portion is used as a keypad overlay.

3. A system for identifying a keypad overlay for a keypad, said system comprising:

an identification code; and a keypad overlay having an identification tab connected to and extending from the keypad overlay, the identification tab being detachable from the keypad overlay and including the identification code;

the identification code being positioned on the identification tab and being indicative of a specific type of keypad overlay for a keypad.

4. The system of claim 1, wherein the identification tab is connected to the keypad overlay by a connector.

5. The system of claim 4, wherein the connector forms an integral portion of the body and the identification tab.

6. The system of claim 1, wherein the identification code is a set of symbols.

7. The system of claim 1, wherein the identification code is a bar code.

8. The system of claim 1, further comprising a layer of material connected to a surface the keypad overlay and connected to a surface of the identification tab and the layer extending from the keypad overlay to the identification tab, each of the surfaces being located on the same side of the keypad overlay.

9. The system of claim 8, wherein the identification tab is operative to facilitate removal of the layer of material upon detachment of the identification tab from the keypad overlay.

10. A substantially planar member for use in conjunction with a keypad, said planar member comprising:

a body portion for use as a keypad overlay;

a detachable identification tab connected to and extending from said body portion, said identification tab being detachable from said body portion and including an identification code;

said identification code being positioned on said identification tab and being indicative of a specific type of keypad overlay for a keypad.

11. A system for identifying a keypad overlay for a keypad, said system comprising:

an identification code; and a keypad overlay including the identification code;

the identification code being indicative of a specific type of keypad overlay for a keypad.

12. A system for identifying a keypad overlay with a specific type of keypad, comprising:

an identification code reader operative to read an identification code positioned on the keypad overlay, the identification code reader having a database of information associated with a plurality of keypad overlays, the database storing information that associates each of a plurality of identification codes to a specific keypad overlay;

each of the identification codes being associated with a keypad overlay that specifies the function of keys on a keypad type; and the identification code reader operative to display, in response to the identification code reader reading the identification code positioned on the keypad overlay, the specific keypad type associated with the identification code positioned on the keypad overlay.

13. The system of claim 12, wherein the identification code reader is a bar code reader.

14. The system of claim 12, wherein the identification code is located on an identification tab, the identification tab connected to and extending from a keypad overlay and the identification tab being detachable from the keypad overlay.

15. The system of claim 14, wherein the identification tab is connected to the keypad overlay by a connector.

16. The system of claim 15, wherein the connector forms an integral portion of the body and the identification tab.

17. The system of claim 12, wherein the identification code is a set of symbols.

18. The system of claim 12, wherein the identification code is a bar code.

19. The system of claim 14, further comprising a layer of material connected to a surface the keypad overlay and connected to a surface of the identification tab and the layer extending from the keypad overlay to the identification tab, each of the surfaces being located on the same side of the keypad overlay.

20. The system of claim 14, wherein the identification tab is operative to facilitate removal of the layer of material upon detachment of the identification tab from the keypad overlay.

* * * * *